United States Patent [19]
Kent, Jr.

[11] 3,769,727
[45] Nov. 6, 1973

[54] INFORMATION DISPLAY SYSTEM

[76] Inventor: Marc T. Kent, Jr., 820 Soundview Dr., Mamaroneck, N.Y.

[22] Filed: Feb. 7, 1972

[21] Appl. No.: 224,136

[52] U.S. Cl. .................................................. 40/62
[51] Int. Cl. ............................................ G09f 11/00
[58] Field of Search ........................ 235/70 R; 40/62

[56] References Cited
UNITED STATES PATENTS

| | | | |
|---|---|---|---|
| 2,500,460 | 3/1950 | Hunt | 235/70 R |
| 711,240 | 10/1902 | Zaring | 40/62 |
| 564,930 | 7/1896 | Hopkins | 40/62 |

FOREIGN PATENTS OR APPLICATIONS

| | | | |
|---|---|---|---|
| 206,913 | 11/1923 | Great Britain | 40/62 |

*Primary Examiner*—Robert W. Michell
*Assistant Examiner*—Vincent A. Millin
*Attorney*—Martin Smolowitz

[57] ABSTRACT

A visual display system including two major members having a display member and a slider member whereby the slider member is fixedly and slidably attached to the display member. Information on the front and rear surfaces of the display member is selectively shown in accordance with the position of the slider member on the main display member. A pair of end stops are provided to control the maximum movement of the slider on the display member. Optional adhesive on the slider can serve as a means for affixing the system for display.

1 Claim, 6 Drawing Figures

PATENTED NOV 6 1973 3,769,727
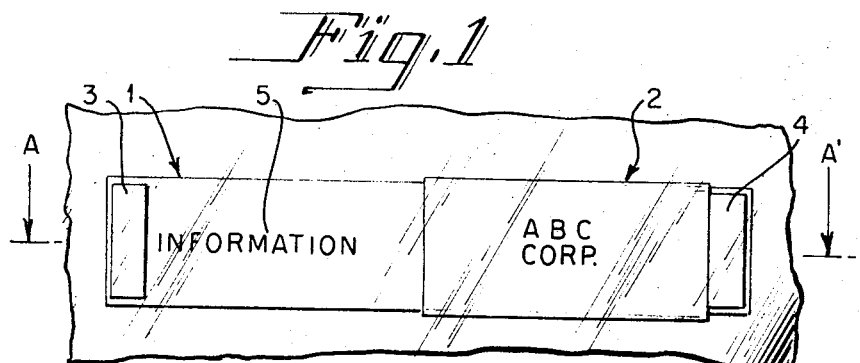
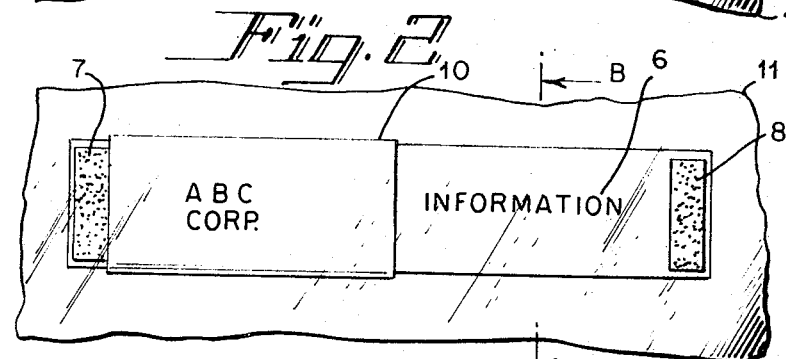
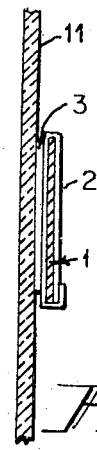
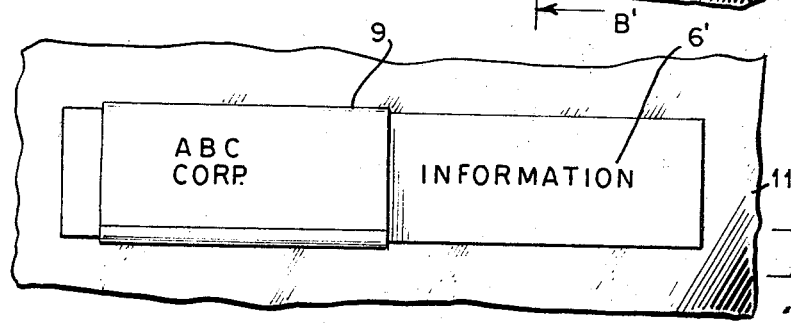
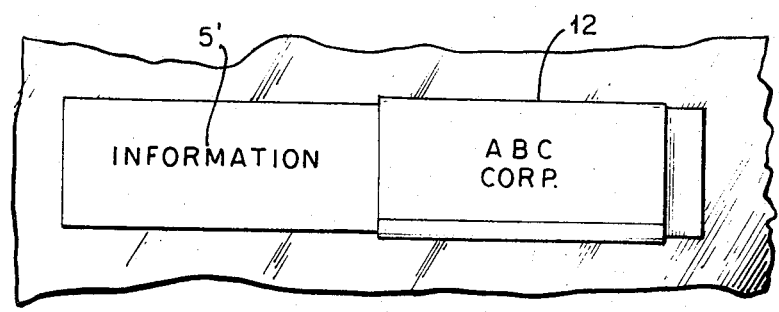
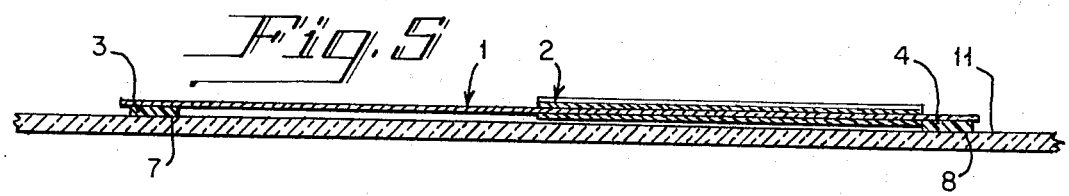

INFORMATION DISPLAY SYSTEM

The present invention relates to an information display system and more particularly to a display system capable of displaying select information in one or more positions.

Information display systems of the type covered by the present invention serve to visually communicate a message to a desired audience in a simple and efficient manner. On the other hand, the art is replete with complex and elaborate systems which are difficult to maintain and expensive. Oftentimes, the cost of producing Trouble-free systems can far exceed the intended results.

There are a number of visual display systems in the prior art which utilize endless belts or continuous loops. With the aforementioned systems, as the name implies, a given message is continuously presented within a prescribed interval. Such arrangements have limitations as to the place of usage, as well as, size requirements suitable for certain applications. Furthermore, these systems are quite costly.

Other display systems are limited as to the kind of information which can be visually displayed. In this category, are ordinary window signs. Obviously, information in this category is intended to only describe a given set of circumstances. The arrangement is simple in nature and relatively inexpensive, but suffers the drawback of usually not being able to be utilized for more than one set of conditions. It follows that a separate but different sign may be required for each and every different message. Thus, the cumulative cost for such signs can be quite prohibitive.

Other visual display systems include: light arrays, rear projection presentations, etc. In all cases, however, these approaches include one or more of the drawbacks mentioned above.

Accordingly, it is the main object of the present invention to eliminate the defects and shortcomings of the prior art.

Another object of the present invention is to provide a simple visual display system capable of delivering more than one message simultaneously.

Still a further object of the present invention is to provide a visual display system that is easy to install, inexpensive and easy to operate.

Another object of the present invention is to provide a visual display system that is particularly suitable for mounting on a glass window or door.

The above and other objects of this invention will become more apparent upon proceeding with the following detailed description when read in light of the accompanying drawings and appended claims.

The present invention is principally directed to a visual display system having a major body member having front and rear display surfaces, a secondary member slidably attached to said major body member adapted to traverse a substantial portion of the length of said major body member; and a pair of retaining stops each respectively disposed at one end of said major body member serving to control the maximum traverse of said secondary member.

Also within the scope of the present invention is a visual display system wherein said secondary member is adapted to have information placed on its exposed main surfaces as displayed on the front and rear panel of said primary body member.

For a more complete understanding of this invention, reference should now be made to the drawing wherein:

FIG. 1 is a plan view of the inventive system mounted on a transparent surface with the slider in extreme right position as seen from the outside of the transparent surface.

FIG. 2 is an identical view of FIG. 1 except the slider is in the extreme left-hand position. FIG. 3 is a plan view of the inventive system mounted on a trasnparent surface with the slider in the extreme left position as seen from the inside of the transparent system.

FIG. 4 is an identical view of FIG. 3 except the slider is in the extreme right-hand position.

FIG. 5 is a sectional view of FIG. 1 taken through A — A'.

FIG. 6 is a sectional view of FIG. 2 taken through B — B'.

Referring now to the accompanying drawings there is illustrated in FIG. 1, the visual display system including two major members. A main display member 1 and a slider member 2 which is fixedly and slidably attached to the display member 1. The slider member 2 is positioned to traverse the length of such display member 1 defined by two stop members 3 and 4, respectively, which are disposed at the left and right ends on one face of the display member 1.

The desired information is placed on the front 5' - 6' and rear portions 5 – 6, of the display member 1 in a manner such that when the slider 2 is moved to the extreme left position (FIGS. 2 and 3) the display member 1 will show the message on exposed portions 6 — 6'. Likewise, if the slider 2 is moved to the extreme right position (FIGS. 1 and 4) the message on the left sector 5 — 5' of the display member 1 will be visible. For purposes of illustration, one slider and a display member, respectively, with two messages per side is described, obviously more than one slider can be employed, as long as there is a sufficient size relationship between the slider 2 and the display member 1 to permit an area in the display member 1 to remain exposed after the sliders are in position. Likewise, the same display member 1 may contain a series of information centers in excess of two per side which are different from one another as long as there are a sufficient number of sliders 2 to eliminate the possibility of displaying conflicting information.

Stop numbers 3 and 4 positioned on display member 1 have for example a re-useable adhesive 7 – 8 integral with the exposed portion of the stops 3 and 4 to serve as the means by which the display system can be mounted for usage (FIG. 6). The stops 3, 4 have sufficient thickness, such that in the mounted position, the slider 2 can freely traverse the display member 1 without being wedged between the transparent surface 11 to which the display system is attached, i.e., glass door, and the display member 2. Also see FIG. 5. For example, as shown in FIG. 2, the display system is adhered to the inside portion of a glass door via stops 3 and 4. Movement of the slider 2 from left or right, or vice versa; simultaneously alters the information displayed on front and rear panels of the display member 1. In addition, information desired to be continuously displayed can be placed on one or both (9,10) faces of the slider 2. The slider 2 is preferably constructed of a material having a higher coefficient of function when compared to the display member 1 enabling it to traverse the length of the display member 1 without difficulty.

It will be apparent to those skilled in the art from the preceding description, that certain changes may be made in the above apparatus without departing from the scope of the invention. It is intended that the descriptive matter above shall be interpreted as illustrative and in no way limiting, since all equivalents within the scope of the disclosure may be substituted and such substitution is intended.

What is claimed is:

1. A visual display device having front and rear sides respectively for use upon a glass substrate or the like enabling simultaneous viewing of both sides of said device at any given time, including the combination of: an elongated primary member provided with two indicia display areas disposed along the length of and on the front and rear sides respectively of such primary member; a secondary member completely surrounding such primary member adjusted to coact therewith, being about half the length of said two indicia display areas of said primary member; said secondary member having indicia on each outer side and being slidably positioned relative to said primary member in order to coordinate indicia between said primary and secondary members; and a pair of abutments of a thickness greater than said secondary member, each being at opposite ends of and affixed on the rear side of said primary members; said abutments being provided with adhesive material to allow said device to be positioned upon said substrate to thereby define a clearance between the substrate and said secondary member for the free movement of such secondary member along said primary member once the display device is positioned; said abutments being fixed on said primary member to further define a maximum traverse of said secondary member along the length of said primary member for assuring the continued presence of said secondary member within the bounds defined by said abutments.

* * * * *